United States Patent [19]

Fuchs et al.

[11] Patent Number: 5,062,914
[45] Date of Patent: Nov. 5, 1991

[54] METHOD FOR AFFIXING A METALLIC TIP TO A TUBE MADE OF COMPOSITE WOUND MATERIAL

[75] Inventors: Jean-François Fuchs, Sainte Helene; Marcel Auberon, Le Haillan; Pierre Odru, Fontenay Sous Bois; Charles Sparks, Le Vesinet, all of France

[73] Assignees: Areospatiale, Paris; Institut Francais du Petrole, Rueil Malmaison, both of France

[21] Appl. No.: 458,471

[22] Filed: Dec. 28, 1989

[30] Foreign Application Priority Data

Dec. 29, 1988 [FR] France .................. 88 17392

[51] Int. Cl.$^5$ .................. B65H 81/00; F16C 3/00
[52] U.S. Cl. .................. 156/172; 156/169; 156/173; 156/267; 464/181; 464/903; 285/239
[58] Field of Search .......... 156/172, 173, 169, 175, 156/425, 250, 267; 464/181, 903, 182; 285/239

[56] References Cited

U.S. PATENT DOCUMENTS

| | | | |
|---|---|---|---|
| 3,282,757 | 11/1966 | Brussee | 156/165 X |
| 3,850,722 | 11/1974 | Kreft | 156/425 X |
| 4,236,386 | 12/1980 | Yates et al. | |
| 4,248,062 | 2/1981 | McLain et al. | 156/173 X |
| 4,288,267 | 9/1981 | McLarty | 156/425 X |
| 4,380,443 | 4/1983 | Federmann et al. | 464/181 |
| 4,529,139 | 7/1985 | Smith et al. | 156/425 X |
| 4,549,919 | 10/1985 | Auberon et al. | 156/172 |
| 4,596,619 | 6/1986 | Marks | 156/173 X |
| 4,704,918 | 11/1987 | Orkin et al. | 464/181 X |
| 4,762,583 | 8/1988 | Kaempen | 156/173 |
| 4,849,152 | 7/1989 | Rumberger | 156/173 X |
| 4,854,988 | 8/1989 | Voirol et al. | 156/173 X |

FOREIGN PATENT DOCUMENTS

| | | |
|---|---|---|
| 0044380 | 1/1982 | European Pat. Off. |
| 54-28368 | 2/1979 | Japan |
| 2017567 | 10/1979 | United Kingdom |
| 2051303 | 1/1981 | United Kingdom |

Primary Examiner—Michael W. Ball
Assistant Examiner—Jeff H. Aftergut
Attorney, Agent, or Firm—Armstrong, Nikaido, Kubovcik, Marmelstein & Murray

[57] ABSTRACT

Fibers, which are substantially longitudinally profiled, are wound both around a cylindrical mandrel and a metallic double cone-shaped tip which is engaged onto said mandrel. Said fibers are turned back about studs distributed on a ring which is mounted on a threaded portion extending from the tip, whereupon said longitudinal fibers are binded thereto by means of circumferential fibers before the polymerization process of the tube has been completed. The composite tubes thus produced may be used in off-shore oil prospecting.

10 Claims, 2 Drawing Sheets

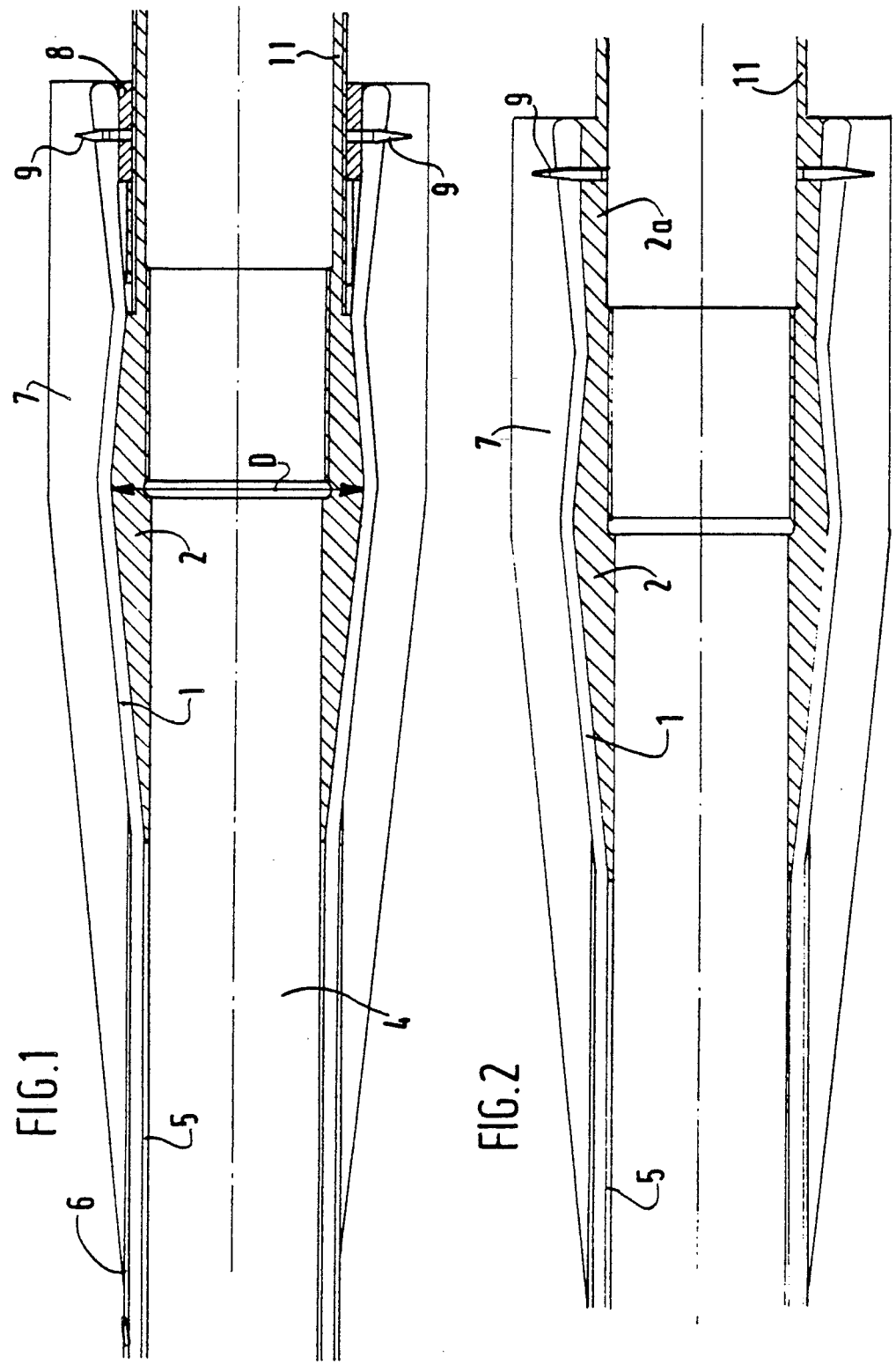

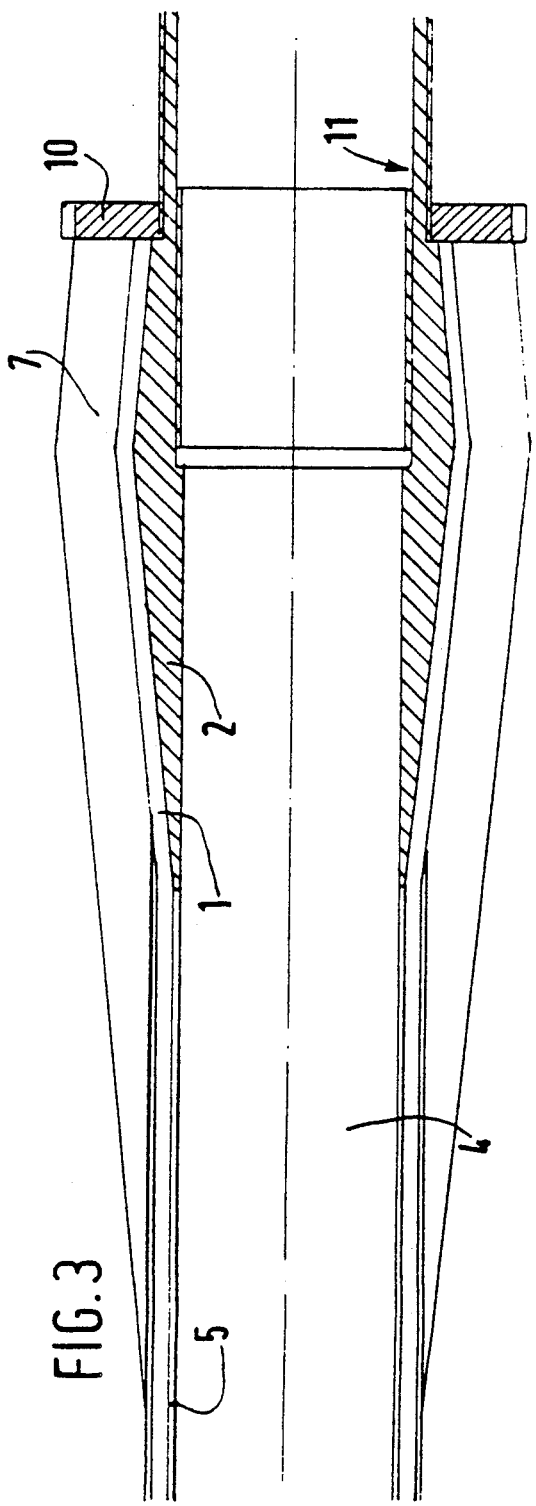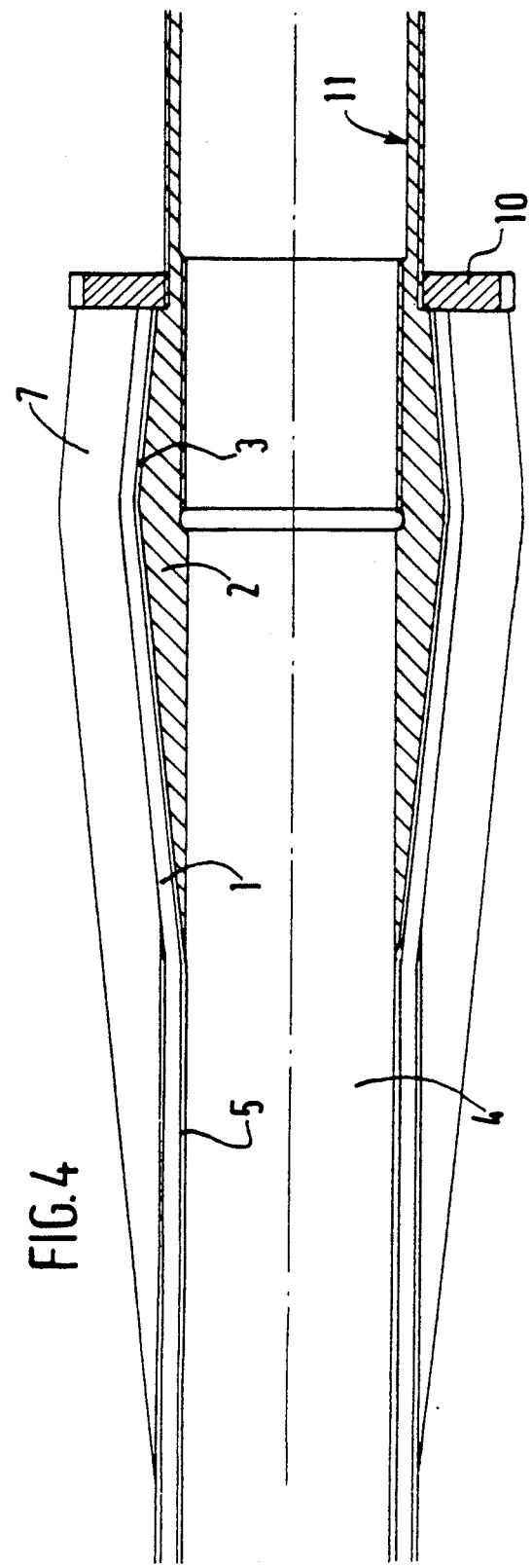

METHOD FOR AFFIXING A METALLIC TIP TO A TUBE MADE OF COMPOSITE WOUND MATERIAL

The invention relates to a process for affixing a metallic tip on a tube made of composite material. It also aims to the tubes made by said method. Such tubes made of composite materials are intended to be particularly used in offshore oil prospecting.

In this peculiar field, tubes and tips thereof must withstand severe tensile strength which can arise under the normal conditions about $10^6$ Newtons. Accordingly it is up to the present advisable to use metallic tubes provided with metallic tips, which have well known properties as regards the tensile strength thereof able to withstand those load strains. In fact, it has been determined that the tensile flux expressed by the formula $$\frac{T}{\pi D},$$

wherein T is the tensile strength and D is the tube diameter, may arise in this field 3,500,000 Newtons/m.

In this field and in that of offshore oil search, the tubes which are made of composite material and provided with metallic tips, said tubes having performance which may be composed to that of known metallic tubes, have valuable advantages especially as regards the endurance limit and corrosion resistance, and the minor weight thereof.

Besides it is to be noted that known connections between tubes made of composite materials and provided with tips which would be also made of composite material would be unsuitable for those peculiar applications since said connections could not be provided with the properties required for said required performances.

Industrial processes are presently known for making tubes made of composite materials and provided with metallic tips, said tubes being able to withstand severe tensile stresses.

According to a first process as disclosed in French Patent 2,509,011 on behalf of the applicant, a conical metallic insert is fitted at the end of a tube made of composite material and an elastomeric foil is placed between external surface of said tip and the internal wall of the relative tube, said elastomeric foil being adhered to said external surface so that the stresses and loads are transmitted through said elastomeric layer. Upon completion of a first polymerization of the tube, a second shell-shaped metallic member is arranged onto the polymerized composite and then bound by means of a peripheral winding, e.g. made of fiber glass. The metal-composite binding is also ensured by means of another elastomeric layer and a second curing is then required for ensuring both polymerizations of the wounded binding and of the adhesive coatings as. well.

According to a further process enabling a tube made by filament winding to be assembled to another member, metallic hollow tubular jackets are interposed between fiber layers made by filament winding, said filament being spaced apart along the radial direction, and that at the end levels. The connection is ensured by securing devices which pass through the composite and the metallic jackets. In this case the tensile stress applied to the metallic tip is transmitted by means of caulking effect to the composite structure.

However said processes involve a costly manufacture during a long period of time since are required either many manual handling procedures during the manufacturing, or long manufacturing cycles especially due to a few polymerization cycles and many handlings resulting therefrom, or further specific appliances which are required to provide a good manufacturing grade, as, for example, boring machines and fixing devices as hereinabove stated for the second process.

There is also a further process for assembling a metallic tip to a tube made of high-pressure composite material in which the end of a member made of composite material surrounds a tip whose end is provided with a shoulder which for instance is trapezoidal-shaped and around which are wound reinforcing fibers made of said composite material, whereas the other end of said tip comprises a high-pressure connector on purpose of assembling the metallic member to be connected thereto. The winding angles with respect to the duct axis are selected in the range from 50° to 60° C., that is important and results in a small longitudinal behaviour which lowers the tensile strength and increases the elongation effects on the composite tube.

Accordingly it is one of the aims of the invention to provide a method which overcomes the drawbacks which are inherent to the known systems herein above started, said method enabling a metallic tip to be affixed to a tube made of composite material while involving a simple process which only requires a few handling procedures which could be automatized.

One object of the invention is thus to provide a method for affixing a metallic tip to a tube made of composite wound material, said method comprising the steps of:

continuously winding the substantially longitudinal fibers both around a cylindrical mandrel as to constitute the main portion of the composite tube and around a metallic tip shaped as a double-cone, and
    then binding said longitudinal fibers on the metallic tip by means of peripheral fibers before carrying out the final polymerization of said tube,
    complementary means being provided on purpose to enhance the affixing of said tip in the tube, thus limiting the elongation of the completed tube.

According to a peculiar feature of the invention, the complementary means for enhancing the affixing of said tip in the tube comprises the winding of said fibers or fiber mats forming the tube, while turning again on studs dispatched on the periphery of a portion extending from the metallic double-cone-shaped tip, said studs being advantageously mounted on a ring located on the externally threaded portion.

Besides, a fiber or a mat consisting of longitudinal fibers can be turned back about two studs, while having a circumferential path between said studs which are passed round by said fiber or mat.

According to an alternative embodiment, the coupling of the longitudinal fibers forming the tube is ensured by means of pins and hooks which are distributed on the periphery of a portion extending from the metallic double cone-shaped tip.

According to another peculiar feature of the invention, a winding is carried out, previous to the continuous winding of longitudinal fibers, about the mandrel portion which is not covered by he tip, as to form an elastomeric sealing film.

According to a further feature of the invention, the method comprises the cutting of the composite which is not yet polymerized when the whole longitudinal fibers are located;

the removal of the stud-bearing ring;

the advance of a nut along said portion up to abut against the end of the conical tip end, and the the winding of the circumferential fibers which are wedged by means of the nut on purpose to ensure the final polymerization.

According to an alternative embodiment, provision is also made for a complementary means for enhancing the affixing of said tip in said tube, thus limiting the elongation of said tube, said means consisting to bind the composite to the metallic tip by an adhesive procedure which is advantageously carried out by means of an elastomeric sheet arranged at the level of the interface thereof.

Another features and advantages of the invention will be readily apparent from the following description with reference to the accompanying drawings in which:

FIG. 1 is a diagrammatic longitudinal cross-sectional view of a composite tube bound to the metallic tip.

FIG. 2 is a diagrammatic longitudinal cross-sectional view of an alternative embodiment of that shown in FIG. 1.

FIG. 3 is a diagrammatic longitudinal cross-sectional view of a further simplified alternative embodiment of the connection assembly according to the invention.

FIG. 4 is a diagrammatic longitudinal cross-sectional view of an alternative embodiment of the connection assembly shown in FIG. 1.

DETAILED DESCRIPTION OF THE PREFERRED EMBODIMENT

There is shown in FIG. 1 a metallic tip 2 having the so-called double-cone shape, i.e. the thickness of the external wall of said tip is gradually increasing from one end thereof up to the external largest diameter D thereof and then decreases towards another end of said tip. Said tip 2 is intended to be wrapped within the longitudinal fibers forming the tube 1 made of composite material. The tube and its tips are recovered by means of a binding assembly 7, made of circumferential fibers, said assembly being intended to rigidly maintain the longitudinal composite fibers in close relationship to the tip which is thus inserted within the fibers. It is understood that such an arrangement causes a tensile stress applied to the tip to be transmitted to the composite member by a wedging effect; the thickness of the circumferential binding assembly 7 is so determined that the radial stresses generated by the conical shape of the insert be taken up. In fact a tensile stress causes the composite member, if the binding assembly is sufficient, to be deviated, whereas the tip 2 due to the double-cone shape thereof cannot be deviated but is kept embedded. The efficiency of this wedging connection is maximal when the tip has been moved from the composite member, since there is a self-wedging effect. As regards the longitudinal fibers forming the tube 1 and intended to take up the tensile stresses in the tube, they have been wound along angles ranging from 5° to 40° with respect to the tube axis. Said tube may also comprise along its main portion circumferential fibers 6.

The double-cone metallic tip 2 as shown in the drawings is extended by an externally threaded portion 11 which is intended to connect various tubes with each other. Use is made of this threaded portion for locating a ring on the periphery of which are positioned a number of studs 9 which may be inclined with respect to a plane at right angles to the axis of the tube. Said inclination enables the coupling to be easier.

When this connecting assembly has to be carried out, the tip 2 provided with its ring 8 is firstly slipped around the support mandrel 4. Then an elastomeric seal skin is wound about the mandrel portion which is not capped by the tip. Then the longitudinal fibers forming the tube 1 are continuously wound while turning back about the studs mounted on rings 8. More precisely, a longitudinal fiber or a mat made of longitudinal fibers are lead to pass round a stud 9 whereupon, along a small circumferential path, they are led to attain a further adjacent stud so as to pass round the latter and turn back so as to longitudinally go back above both tip 2 and tube 1. It has to be noted that the fibers may thus pass round a sole stud or two closely adjacent studs or even studs which are not closely adjacent. In the latter case, the fibers have a circumferential path above ring 8 and between the two studs around which said fibers pass round. Thus the threads are stabilized as the direction of location of the longitudinal fibers is reversed. Subsequently, as previously stated, said longitudinal layers are bound onto the metallic tip 2 by means of a circumferential winding 7. The final characteristics of the composite assembly are provided by means of a final polymerization process.

As shown in FIG. 1, the studs 9 are held within the circumferential wrap by means of the product thus obtained. The longitudinal yarn winding about the studs causes then the stresses to be transmitted from the metallic tip to the composite assembly. According to another embodiment, such as that shown in FIG. 2, the picots 9 are not positioned in a ring as in the previous case, but are directly affixed to an end 2a of tip 2, which has been accordingly modified, the threaded portion 11 extending from said end 2a. As in the embodiment shown in FIG. 1, a circumferential wrap 7 is provided for binding the longitudinal layers 1 which pass round the studs before the polymerization of the tube has been completed. As an alternative embodiment, provision could be made of a plurality of stud rows according to the performances required for the tube. These windings around the studs enable the longitudinal displacement effect of the tip with respect to the composite tube, said displacement effect enhancing the connection self-wedging to be reduced and thus to limit the whole elongation of the assembly to a suitable amount. This feature, when applied to oil working, enables a safety coupling to be provided when the tensile stress rupture could be exceeded. In fact, due to the association between this rigid coupling system involving the studs, and the resilient coupling system formed by the double-cone tip, the possible rupture of the coupling system would firstly occur at the level of the studs. However the whole auto-wedging system comprising the double-cone tip would remain efficient as to substantially hold said coupling for safeguarding the off-shore tube line. This feature thus forms a so-called "fail-safe" safety system.

According to a simplified embodiment as depicted in FIG. 3, as the whole longitudinal mats are positioned, the composite not yet polymerized is cut; the stud ring is removed, then the nut is moved forward along threading 11 up to abut against the end of the conical portion us tip 2. Then a reinforcement of circumferential fibers is wound thereabout, said tip end being held and clamped by means of nut 10. Finally the fiber assembly is polymerized so as to provide a suitable stiffness to the tube. In this particular case which relates to a simplified embodiment, the elongation relating to the tensile strength may be substantially high, and can only be compensated by a wedging effect between the tube and the double-cone tip, and accordingly, as shown in FIG. 4, it is advisable to bind the composite member to the metallic tip 2 by an adhering process using an epoxy adhesive to be applied at the tip-tube interface by means of an elastomeric foil 3. The relative displacement of the metal with respect to the composite would be then limited to the shearing deformation of the adhesive layers consisting of the elastomeric layer 3 extending from the elastomeric layer 5 provided around the main portion of the tube.

The invention is not limited to the embodiments herein described but encompasses the alternative embodiments as regards the means for the longitudinal fibers, which may be pins, hooks and like systems enabling the studs to be replaced.

We claim:

1. Method for affixing a metallic tip to a tube made of composite material, in which a metallic tip which is to be affixed to the tube has an external double-cone shape which includes two conical portions meeting at a central cone base, in which a cone radius decreases with respect to axial distance from the central cone base, comprising the steps of:

arranging the metallic tip adjacent to an end of the mandrel;

continuously winding fibers about said mandrel to form a composite tube, including winding said fibers longitudinally along the mandrel and longitudinally along both conical portions of said metallic tip; and before completion of said composite tube by polymerization, applying complementary means for circumferentially binding said fibers which are longitudinally arranged for preventing separation of said metallic tip from said composite tube when axial force is applied along said composite tube, said complementary means limiting radial expansion of said composite tube;

wherein said complementary means includes providing a plurality of studs circumferentially distributed along a peripheral portion of said metallic tip, and said step of arranging said complementary means includes the steps of circumferentially winding fibers about the longitudinally arranged fibers forming said composite tube, and in said step of longitudinally winding fibers, further comprising the step of winding the longitudinally arranged fibers about ones of said plurality of studs distributed on said peripheral portion of said metallic tip;

wherein said complementary means includes an externally threaded portion and a ring connected to said externally threaded portion, and wherein each of said plurality of studs are mounted on said ring; and wherein in said step of longitudinally winding the fibers to form said composite tube, withdrawing said ring prior to polymerization of said composite tube, and providing a nut in threaded engagement on said externally threaded portion until said nut comes in abutment against an end of said metallic tip, and then completing said step of circumferentially winding the fibers such that they are wedged by said nut before completing the polymerization.

2. Method according to claim 1, wherein the longitudinally arranged fibers forming said composite tube are wound along angles ranging from 5 to 40° with respect to a longitudinal axis of said composite tube.

3. Method according to claim 1, wherein said step of applying said complementary means includes circumferentially winding fibers directly about said composite tube.

4. Method according to claim 1, wherein each of said plurality of studs are rigidly secured to one end of said metallic tip.

5. Method according to claim 4, wherein each of said plurality of studs are inclined with respect to a plane which is oriented at a right angle to a longitudinal axis of said composite tube.

6. Method according to claim 5, further comprising a plurality of stud rows on said externally threaded portion.

7. Method according to claim 1, wherein in said step of applying said complementary means, providing a plurality of pins distributed on a peripheral area of a portion which extends from said metallic tip.

8. Method according to claim 1, wherein, previous to the step of winding of the longitudinal fibers, winding an elastomeric seal film around the mandrel.

9. Method according to claim 1 wherein in said step of longitudinally winding the fibers to form said composite tube, winding a group of fibers about two studs such that said group of fibers extends along a circumferential path between said two studs about which they pass.

10. Method according to claim 1, wherein in said step of applying said complementary means, providing an adhesive and an elastomeric foil, and forming an adhesive interface between the composite material forming said composite tube and said metallic tip.

* * * * *